United States Patent [19]
Lawton, III

[11] Patent Number: 5,598,810
[45] Date of Patent: Feb. 4, 1997

[54] LITTER FILTERING SYSTEM

[76] Inventor: Glenn S. Lawton, III, 940 Downingtown Pike, West Chester, Pa. 19380

[21] Appl. No.: 419,463

[22] Filed: Apr. 10, 1995

[51] Int. Cl.$^6$ .................................................. A01K 1/035
[52] U.S. Cl. ....................................................... 119/166
[58] Field of Search ..................................... 119/165, 166

[56] References Cited

U.S. PATENT DOCUMENTS

| | | | |
|---|---|---|---|
| 4,096,827 | 6/1978 | Cotter | 119/166 |
| 4,325,325 | 4/1982 | Larter | 119/166 |
| 5,012,765 | 5/1991 | Naso et al. | 119/166 |
| 5,032,254 | 7/1991 | Deboer et al. | 119/161 X |
| 5,168,834 | 12/1992 | Buschur | 119/166 |
| 5,178,099 | 1/1993 | Lapps et al. | 119/166 |
| 5,211,133 | 5/1993 | Foley | 119/166 |
| 5,220,886 | 6/1993 | Hyde | 119/165 |
| 5,272,999 | 12/1993 | Nussle | 119/166 |

*Primary Examiner*—Robert P. Swiatek

[57] ABSTRACT

A litter filtering system for filtering animal litter to remove impurities therefrom. The inventive device includes first and second containers operable for receiving a supply of litter for use by a pet. A screen assembly is adapted for positioning over the first container and receiving the second container in an inverted position on top of the first container such that the screen assembly is positioned between the containers. The assembly can then be manually rotated so as to position the first container in an inverted position, whereby the litter is caused to filter through the screen assembly and into the second container.

2 Claims, 3 Drawing Sheets

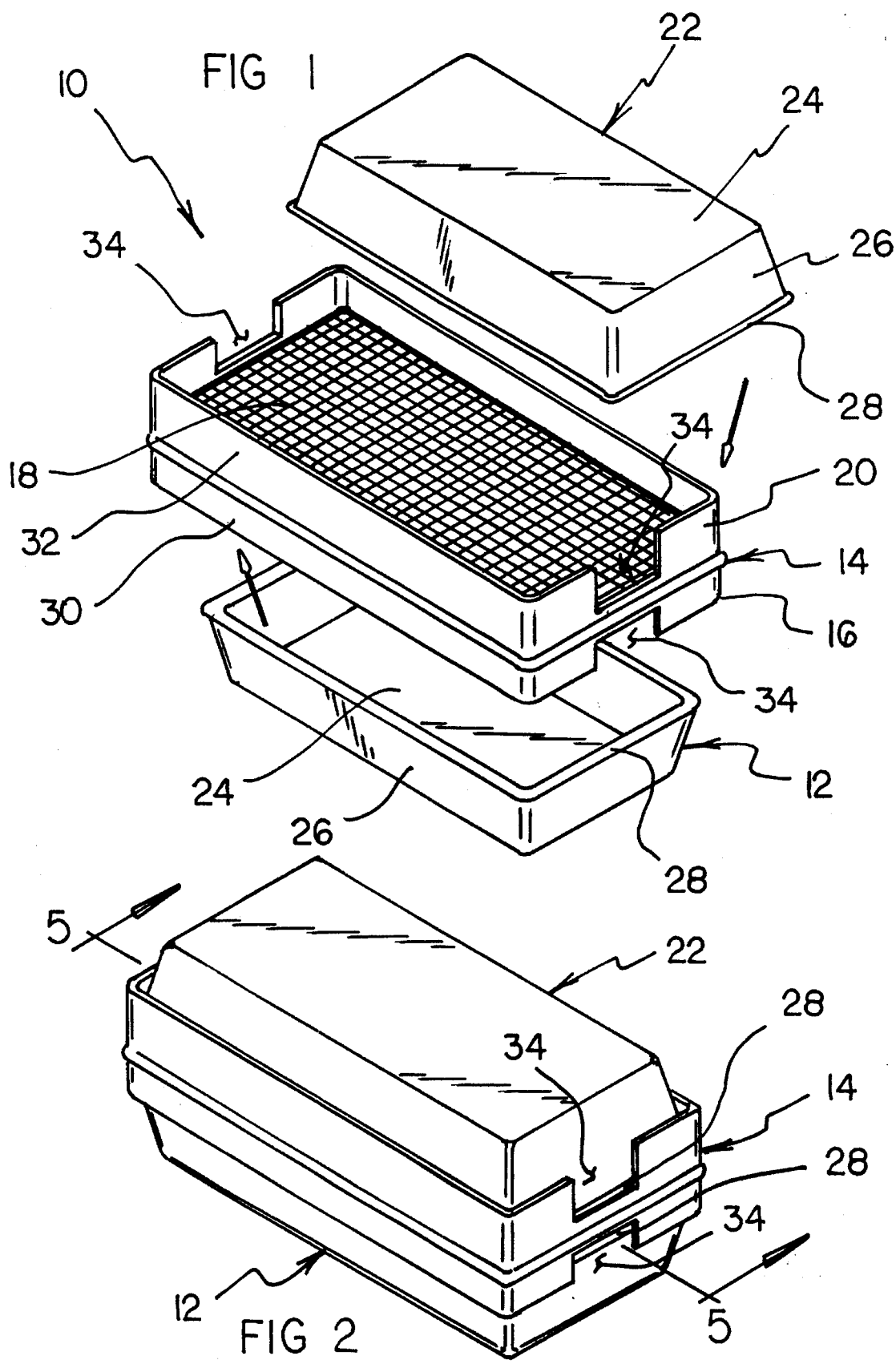

LITTER FILTERING SYSTEM

BACKGROUND OF THE INVENTION

1. Field of the Invention

The present invention relates to litter handling devices and more particularly pertains to a litter filtering system for filtering animal litter to remove impurities therefrom.

2. Description of the Prior Art

The use of litter handling devices is known in the prior art. More specifically, litter handling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art litter handling devices include U.S. Pat. Nos. 5,211,133; 5,272,999; 5,220,886; 5,178,099; and 5,032,254.

While these devices fulfill their respective, particular objectives and requirements, the aforementioned patents do not disclose a litter filtering system for filtering animal litter to remove impurities therefrom which includes first and second containers operable for receiving a supply of litter for use by a pet, and a screen assembly adapted for positioning over the first container and receiving the second container in an inverted position on top of the first container such that the screen assembly is positioned between the containers, wherein the assembly of the containers and screen assembly can be manually rotated so as to position the first container in an inverted position, whereby the litter is caused to filter through the screen assembly and into the second container.

In these respects, the litter filtering system according to the present invention substantially departs from the conventional concepts and designs of the prior art, and in so doing provides an apparatus primarily developed for the purpose of filtering animal litter to remove impurities therefrom.

SUMMARY OF THE INVENTION

In view of the foregoing disadvantages inherent in the known types of litter handling devices now present in the prior art, the present invention provides a new litter filtering system construction wherein the same can be utilized for filtering animal litter to remove impurities therefrom. As such, the general purpose of the present invention, which will be described subsequently in greater detail, is to provide a new litter filtering system apparatus and method which has many of the advantages of the litter handling devices mentioned heretofore and many novel features that result in a litter filtering system which is not anticipated, rendered obvious, suggested, or even implied by any of the prior art litter handling devices, either alone or in any combination thereof.

To attain this, the present invention generally comprises a litter filtering system for filtering animal litter to remove impurities therefrom. The inventive device includes first and second containers operable for receiving a supply of litter for use by a pet. A screen assembly is adapted for positioning over the first container and receiving the second container in an inverted position on top of the first container such that the screen assembly is positioned between the containers. The assembly can then be manually rotated so as to position the first container in an inverted position, whereby the litter is caused to filter through the screen assembly and into the second container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any It is therefore an object of the present invention to provide a new litter filtering system apparatus and method which has many of the advantages of the litter handling devices mentioned heretofore and many novel features that result in a litter filtering system which is not anticipated, rendered obvious, suggested, or even implied by any of the prior art litter handling devices, either alone or in any combination thereof.

It is another object of the present invention to provide a new litter filtering system which may be easily and efficiently manufactured and marketed.

It is a further object of the present invention to provide a new litter filtering system which is of a durable and reliable construction.

An even further object of the present invention is to provide a new litter filtering system which is susceptible of a low cost of manufacture with regard to both materials and labor, and which accordingly is then susceptible of low prices of sale to the consuming public, thereby making such litter filtering systems economically available to the buying public.

Still yet another object of the present invention is to provide a new litter filtering system which provides in the apparatuses and methods of the prior art some of the advantages thereof, while simultaneously overcoming some of the disadvantages normally associated therewith.

Still another object of the present invention is to provide a new litter filtering system for filtering animal litter to remove impurities therefrom.

Yet another object of the present invention is to provide a new litter filtering system which includes first and second containers operable for receiving a supply of litter for use by a pet, and a screen assembly adapted for positioning over the first container and for receiving the second container in an inverted position on top of the first container such that the screen assembly is positioned between the containers.

Even still another object of the present invention is to provide a new litter filtering system wherein the assembly of the containers and screen assembly can be manually rotated so as to position the first container in an inverted position, whereby the litter is caused to filter through the screen assembly and into the second container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded isometric illustration of a litter filtering system according to the present invention.

FIG. 2 is an isometric view of the present invention.

DESCRIPTION OF THE PREFERRED EMBODIMENT

Figure 3:
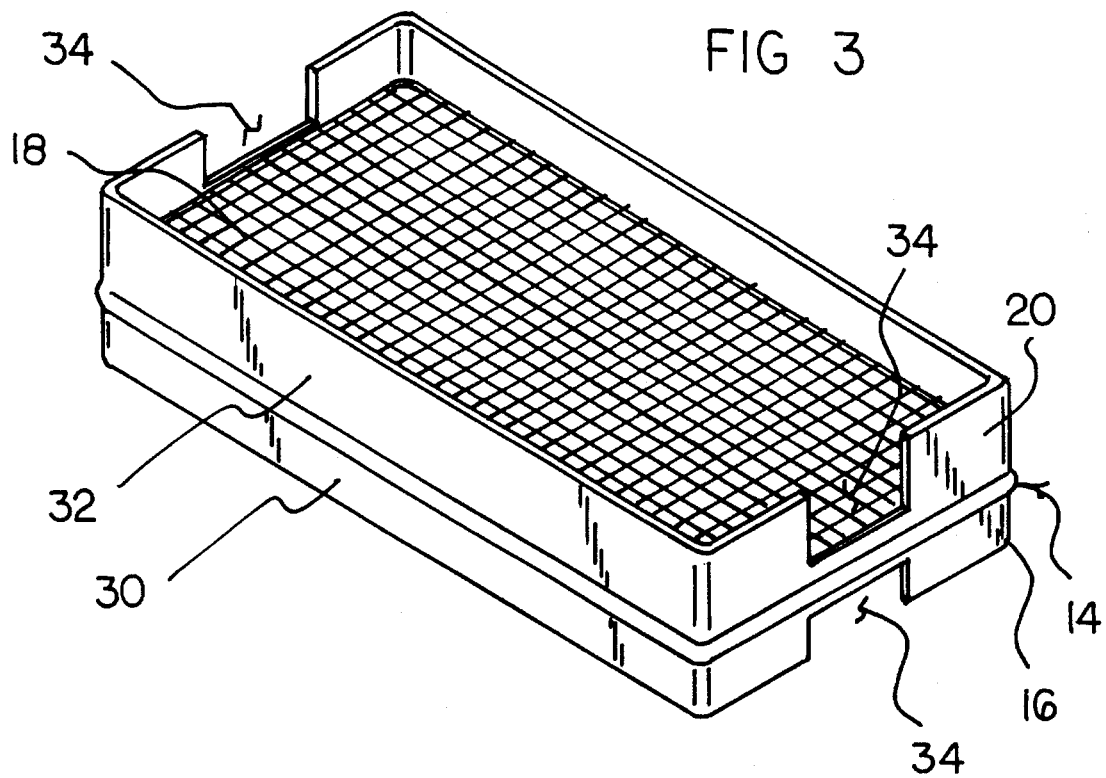
FIG. 3 is an isometric illustration of a screen assembly of the invention.

With reference now to the drawings, and in particular to FIGS. 1–6 thereof, a new litter filtering system embodying the principles and concepts of the present invention and generally designated by the reference numeral 10 will be described.

More specifically, it will be noted that the litter filtering system 10 comprises a first container 12 positionable upon a support surface and operable to receive and support a volume of animal litter. A screen assembly 14 includes a first receiver 16 positionable at least partially over the first container 12. A screen panel 18 extends across the first receiver and a second receiver 20 projects from the screen panel 18 in a direction opposite relative to the first receiver 16. A second container 22 is provided with the present invention 10 and can be positioned within the second receiver 20 of the screen assembly 14. By this structure, the screen assembly can be interposed between the containers, whereby a rotation of the device 10 will then permit a gravitationally induced biasing of the litter material from the first container 12 through the screen panel 18 and into the second container 22 to filter the litter and remove impurities therefrom.

As shown in FIG. 1, the containers 12 and 22 are substantially similar in design and configuration and each comprises a bottom panel 24 having a perimeter side wall 26 projecting from an outer periphery of the bottom panel. A gripping flange 28 extends outwardly from a free edge of the perimeter side wall 26 spaced from the bottom wall 24 so as to permit an individual to grasp and manipulate the containers 12 and 22 during use of the device 10. The containers 12 and 22 can be made from any suitable material and are preferably integrally molded from a plastic or polymeric material.

Figure 4:
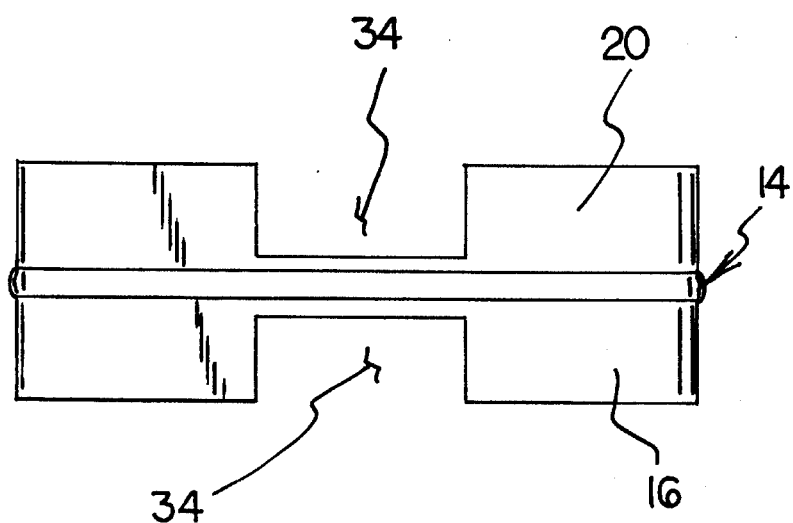
FIG. 4 is a side elevational view of the screen assembly.
Figure 5:
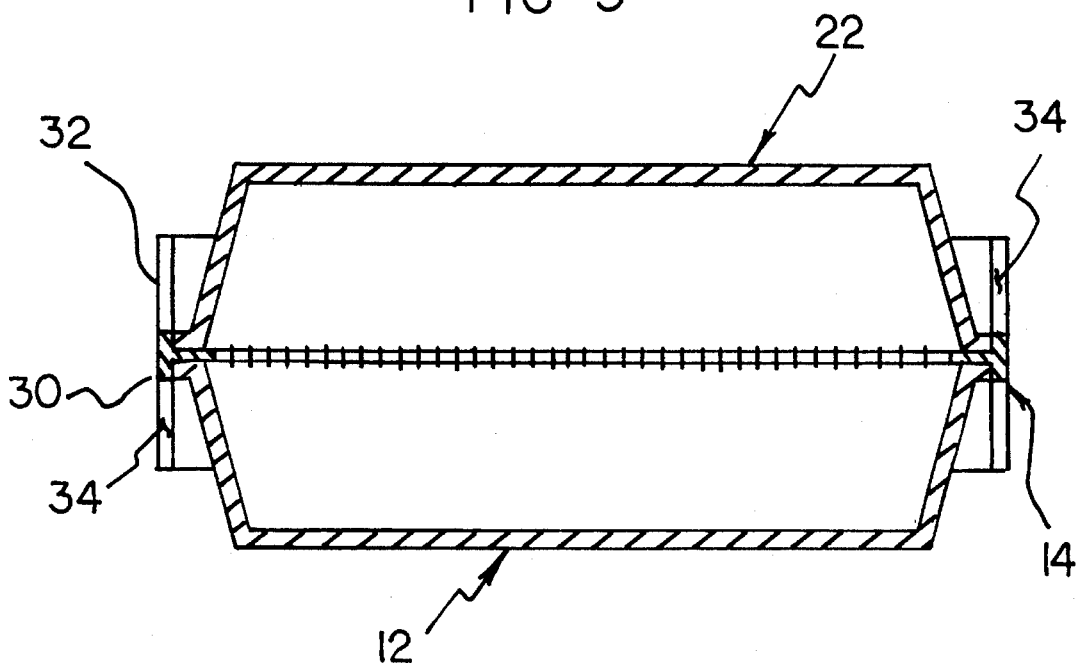
FIG. 5 is a cross sectional view taken along line 5—5 of FIG. 2.
Figure 6:
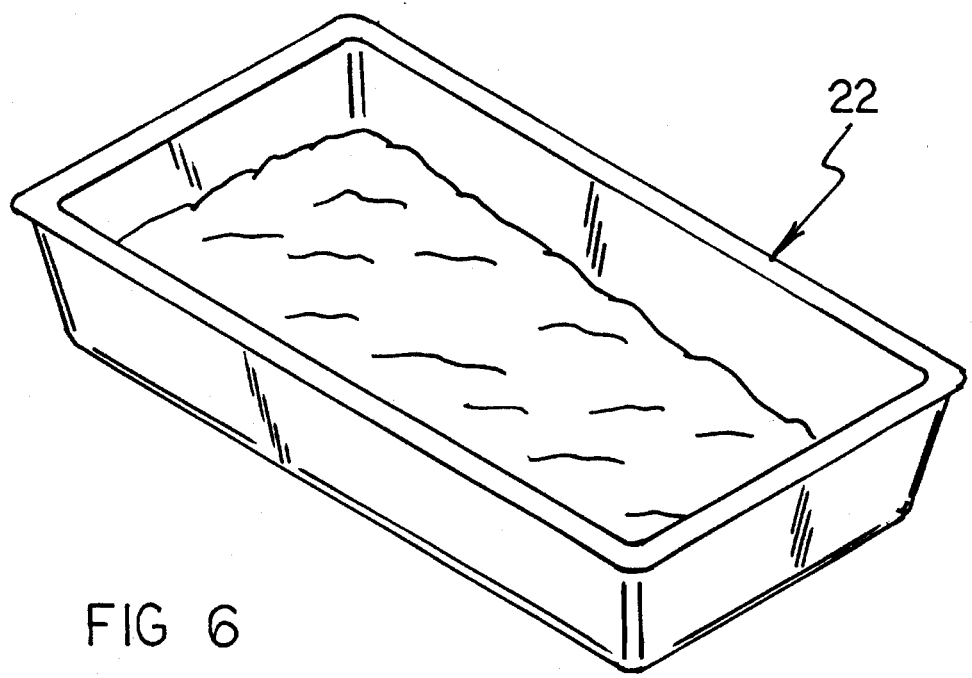
FIG. 6 is an isometric illustration of a second container of the invention containing clean and filtered litter material.

Referring now to FIGS. 3 through 5 with concurrent reference to FIG. 1, it can be shown that the screen assembly 14 of the present invention 10 preferably comprises a continuous vertical side wall having spaced first and second perimeter edges. The screen panel 18 extends across an interior of the vertical side wall and is positioned medially between the first and second perimeter edges so as to define a first vertical side wall 30 extending in a first direction, and a second vertical side wall 32 extending in a second direction. A pair of handling apertures 34 is directed into opposed sides of each of the vertical side walls 30 and 32 and extends towards the screen panel 18 to terminate proximal thereto so as to complete the definition of the first and second receivers 16 and 20. Thus, when the containers are positioned within the screen assembly 14 and in the facing relationship illustrated in FIG. 2, an individual is permitted to grasp the flanges 28 of the respective containers 12 and 22 so as to secure the assembly 10 together during rotating of the device. By this structure, soiled or otherwise impure litter residing within the first container 12 can be selectively transferred into the second container 22. The filtered litter can then be left within the second container 22 as illustrated in FIG. 6 for continued use by a pet.

In use, the litter filtering system 10 according to the present invention can be easily utilized to effecting filtering of soiled litter. The present invention 10 serves to lengthen a useful life of the litter to reduce cost of replacement and wasting of usable litter material.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A litter filtering kit comprising:

a first container adapted for holding litter and having an open end;

a screen assembly including a first receiver adapted to be positioned over the open end of the first container, the screen assembly further including a screen panel extending across the first receiver, and a second receiver projecting from the screen panel in a direction opposite relative to a direction of the first receiver; and a second container adapted for positioning within the second receiver of the screen assembly, whereby the screen assembly can be interposed between the containers such that a rotation of the containers and screen assembly can causes a gravitationally induced biasing of litter from the first container through the screen panel and into the second container to filter the litter and remove impurities therefrom, wherein the containers each comprises a bottom panel having a perimeter side wall projecting from an outer periphery of the bottom panel; and a gripping flange extending outwardly from a free edge of the perimeter side wall and spaced from the bottom wall, wherein the screen assembly comprises a continuous vertical side wall having spaced first and second perimeter edges, the screen panel extending across an interior of the vertical side wall and being positioned medially between the first and second perimeter edges so as to define a first vertical side wall extending in a first direction, and a second vertical side wall extending in a second direction opposite relative to the first direction, the first vertical side wall being shaped so as to define a pair of handling apertures directed into opposed sides thereof and terminating proximal to the screen panel, and the second vertical side wall being shaped so as to define a pair of handling apertures directed into opposed sides thereof and terminating proximal to the screen panel such that when the containers are positioned within the screen assembly an individual is permitted to grasp the flanges of the respective containers so as to secure the screen assembly between the containers.

2. A litter filtering system comprising:

a first container adapted for holding litter and having an open end;

a screen assembly including a first receiver positioned over said open end of the first container, the screen assembly further including a screen panel extending across the first receiver, and a second receiver projecting from the screen panel in a direction opposite relative to a direction of the first receiver; and a second container positioned within the second receiver of the screen assembly, whereby the screen assembly is interposed between the containers such that a rotation of the containers and screen assembly causes a gravitationally induced biasing of litter from the first container through the screen panel and into the second container to filter the litter and remove impurities therefrom, wherein the containers each comprises a bottom panel having a perimeter side wall projecting from an outer periphery of the bottom panel; and a gripping flange extending outwardly from a free edge of the perimeter side wall and spaced from the bottom wall, wherein the screen assembly comprises a continuous vertical side wall having spaced first and second perimeter edges, the screen panel extending across an interior of the vertical side wall and being positioned medially between the first and second perimeter edges so as to define a first vertical side wall extending in a first direction, and a second vertical side wall extending in a second direction opposite relative to the first direction, the first vertical side wall being shaped so as to define a pair of handling apertures directed into opposed sides thereof and terminating proximal to the screen panel, and the second vertical side wall being shaped so as to define a pair of handling apertures directed into opposed sides thereof and terminating proximal to the screen panel such that when the containers are positioned within the screen assembly an individual is permitted to grasp the flanges of the respective containers so as to secure the screen assembly between the containers.

* * * * *